United States Patent [19]

Hikuma et al.

[11] Patent Number: 5,426,690
[45] Date of Patent: Jun. 20, 1995

[54] CORDLESS TELEPHONE APPARATUS WHICH RESTORES RADIO CHANNELS AFTER POWER LOSS

[75] Inventors: Hideo Hikuma; Masaru Akiyama, both of Chiba, Japan

[73] Assignee: Uniden Corporation, Ichikawa, Japan

[21] Appl. No.: 99,313

[22] Filed: Jul. 30, 1993

[30] Foreign Application Priority Data

Aug. 4, 1992 [JP] Japan .................... 4-226540

[51] Int. Cl.$^6$ .............................................. H04Q 7/20
[52] U.S. Cl. .......................................... 379/62; 379/61
[58] Field of Search ............... 379/58, 61, 62; 380/23; 455/33.1, 34.1, 51.1, 54.1, 38.5, 127, 186.1, 343

[56] References Cited

U.S. PATENT DOCUMENTS

| | | | |
|---|---|---|---|
| 4,991,198 | 2/1991 | Tate et al. | 379/62 |
| 4,995,083 | 2/1991 | Baker et al. | 379/62 |
| 5,280,541 | 1/1994 | Marko et al. | 379/61 |

*Primary Examiner*—Curtis Kuntz
*Assistant Examiner*—William Cumming

*Attorney, Agent, or Firm*—Oblon, Spivak, McClelland, Maier, & Neustadt

[57] ABSTRACT

A cordless telephone apparatus detects the received field strength in a receive channel, as viewed from the base unit side, and if the field strength is below a prescribed level outputs an out-of-range signal on a receive channel, as viewed from the base unit side. The remote unit is provided with a volatile memory area for storing channel connection state data indicating whether or not two-way radio communication was established between the remote unit and the base unit. A backup power source enables the contents of the volatile memory area to be maintained even if there is an interruption in the supply of power from the battery in the remote unit. A call resumption control circuit to resume transmission of call information from the remote unit when internal power in the remote unit is supplied from the battery. The data in the volatile memory area indicating the channel connection state indicates whether two-way radio communication was established, and also detects an out-of-range signal transmitted from the base unit side.

10 Claims, 4 Drawing Sheets

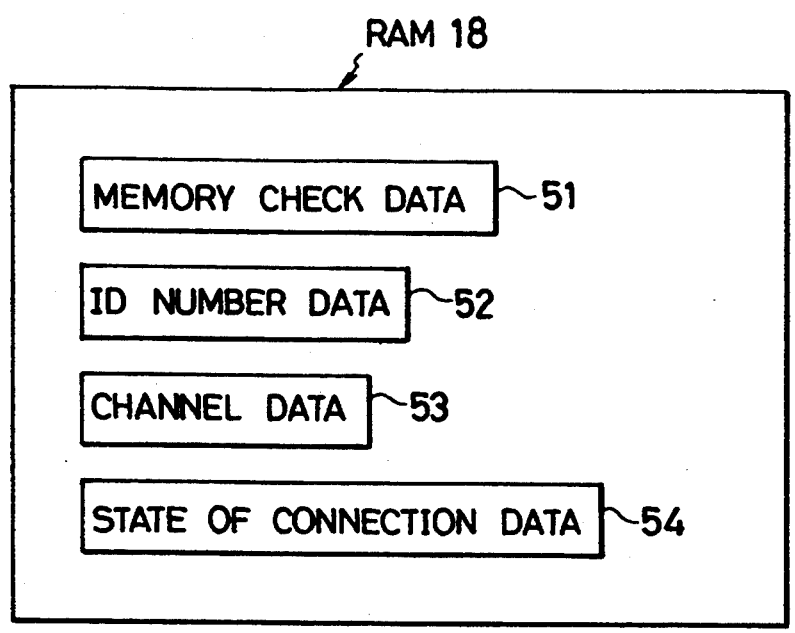
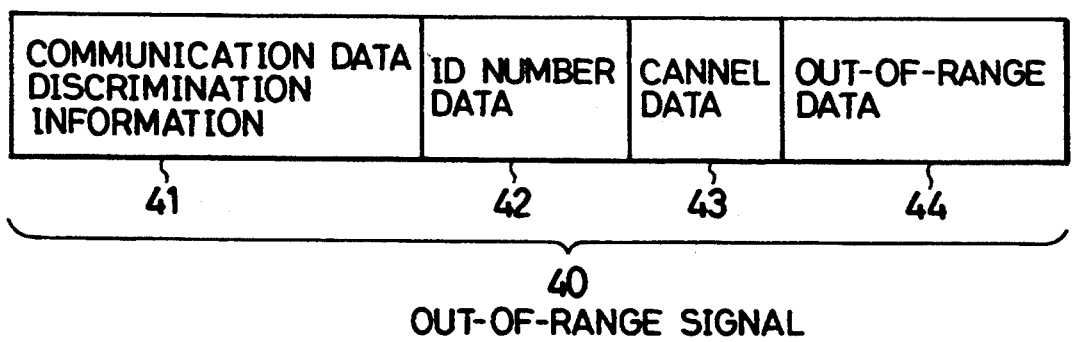

CORDLESS TELEPHONE APPARATUS WHICH RESTORES RADIO CHANNELS AFTER POWER LOSS

BACKGROUND OF THE INVENTION

1. Field of the Invention

The present invention relates to a cordless telephone apparatus, particularly to a cordless telephone apparatus that, when during the course of a telephone call there has been a brief interruption of power to the internal circuits of the remote unit (such as caused by the internal battery of the remote unit losing contact with the battery contacts, for example), enables the telephone call to be resumed over the same pair of transmit-receive radio channels established for the call.

2. Description of the Prior Art

There are known cordless telephone systems consisting of: a base unit that is driven from a commercial power source and has a wired connection to a public telephone line circuit; and a remote (handset) unit driven by an internal primary or secondary battery source; and two radio channels of different frequencies used to provide a two-way or bidirectional communication link between the base unit and remote unit. Recently systems in which a single base unit can handle multiple remote units have become popular. Multiple base unit configurations are also possible.

FIG. 5 shows a conventional type of cordless telephone apparatus arrangement consisting of one base unit 90 and multiple remote units 80. As the multiple remote units 80 all have the same internal circuit configuration, only one remote unit 80 is shown.

Because the base unit 90 does not get moved around much, it can be driven from a commercial power source. The commercial power circuit 29 shown in the drawing can encompass an AC adapter or the like that provides a rectified output to power the internal circuits of the base unit. On the other hand, the convenience of the remote unit 80 resides in its portability, which means it has to rely on a primary or secondary battery 19 as its power source. In view of the fact that primary batteries have a limited current capacity and secondary batteries have a limited service life in terms of the number of charge-and-discharge cycles, it has to be easy for a user to replace the battery, whether the battery 19 is a secondary or a primary battery. As described later, this has a bearing on the problem to be solved by this invention. Here, however, we will continue with the general description of the arrangement of FIG. 5.

Nowadays the main control circuit set that provides integrated control of the internal circuits in both the remote unit and the base unit is usually a microcomputer. In this system the transmit-receive circuit 12 in the remote unit 80 is controlled by an internal microcomputer 16 and the transmit-receive circuit 22 in the base unit 90 is likewise controlled by an internal microcomputer 26, to thereby effect two-way communication of the various control and voice signals between antennas 11 and 21, via a pair of radio channels (pair of radio frequencies). A calling signal indicating a call coming in via the public telephone service line, an originating signal indicating an outgoing call from the remote unit 80, dial signals accompanying the operation of a keyboard (not shown) provided on the remote unit 80, and an end code signal indicating the termination of a call are some control signals. Other control signals include the out-of-range signal described later. Generally these are all digital signals that follow a prescribed format and which are appropriately modulated in accordance with the respective modulation systems of the transmit-receive circuits 12 and 22 for transmission via the antennas 11 and 21.

The microcomputers 16 and 26 also each perform other control functions specific to the associated remote unit 80 and base unit 90. In the case of the remote unit 80, one such control function relates to battery saving or battery conservation operation. This consists of supplying power to the transmit-receive circuit 12 being switched on and off by the transmit-receive power control circuit 13 under the control of the microcomputer 16. In the waiting-for-call state or the stand-by state the supply of power from the battery 19 to the transmit component of the transmit-receive circuit 12 is switched off and just the receive component of the transmit-receive circuit 12 is intermittently operational by power from the battery 19 being switched on and off at prescribed intervals under the control of the transmit-receive power control circuit 13. When multichannel access (usually abbreviated to "MCA") system is used for the two-way radio communication between multiple remote units 80 and the base unit 90, the receive component of the transmit-receive circuit 12 is only able to scan the plurality of usable receiving channels (sending channels, if viewed from the base unit end) when it is receiving power from the battery under the control of the transmit-receive power control circuit 13. When a fixed-channel system is used, the receive component is tuned to the preset channel frequencies. If the scanning by the MCA system or the tuning by the fixed-channel system produces no signal detection and demodulation output by the receive component of the transmit-receive circuit 12, the power to the receive component is switched off by the transmit-receive power control circuit 13 under the control of the microcomputer 16, and is switched back on after a prescribed time period.

On the other hand, when the receive component of the transmit-receive circuit 12 does show a signal detection and demodulation output, the demodulated information is decoded by the microcomputer 16, and when this information is found to contain the specific address data, meaning (the ID (identification) number data), assigned to its own remote unit 80, in order to continue the following operation and start actual voice communication, the transmit-receive power control circuit 13 continues to supply battery power to both the receive component and the transmit component of the transmit-receive circuit 12 until the microcomputer 16 has transmitted an end code via the transmit component of the transmit-receive circuit 12, in response to the user either operating a switch (not shown) to terminate calling or placing the remote unit 80 on its charger cradle (also not shown). Voice information demodulated during the operation of the receive component reaches the user via the telephone receiver (not shown) of the remote unit and. Likewise, voice information spoken into the telephone transmitter is modulated by the transmit component and transmitted from the antenna 11, via the established sending channel (receiving channel, viewed from the base unit).

In response to the user either lifting the remote unit 80 from the charger cradle (not shown) or operating a switch (also not shown) to originate a call, an originate call signal is transmitted by the microcomputer 16 and followed by the transmission of a dialing signal to establish a state of communication with the other party via a public telephone line, after which power is supplied continuously to the transmit-receive circuit 12 until an end code has been transmitted by the microcomputer 16. This is also the case when the other party's line is busy and the person using the remote unit, therefore, intentionally terminates the attempted communication.

In contrast, because the power to the base unit 90 comes from the commercial power line 29, under the control of the microcomputer 26, a transmission power control circuit 23 supplies power to the transmit component of the transmit-receive circuit 22 only when it has to transmit (this is done mainly to prevent unwanted EMF radiation when transmission is not necessary, rather than to save power), but the receive component of the transmit-receive circuit 22 receives a constant supply of power and waits for an originate call signal from the remote unit 80 by continuously scanning the prescribed plurality of receiving channels (sending channels, if viewed from the remote unit 80 end), when an MCA system is used, or, if a fixed-channel system is being used, by remaining tuned to the fixed channel. The base unit 90 is connected to a public telephone line via a line switching circuit 25 that includes a hybrid circuit or the like. Under the control of the microcomputer 26 this circuit 25 forms at least the same line switching control as a normal wired telephone set.

A conventional cordless telephone apparatus also incorporates, in the remote unit 80, a voltage detection circuit 15 that monitors the voltage of the replaceable battery 19. If the output voltage of the battery 19 drops below a prescribed level during a call, a signal indicating this is output by the voltage detection circuit 15 whereby, via an interface (not shown), the microcomputer 16 activates a light-emitting diode or other such light-emitting means and/or causes the telephone receiver to emit a warning sound to inform the user that the battery 19 needs charging. While it depends on the apparatus concerned, if the battery is not charged and the voltage continues to drop, the microcomputer 16 goes into a stop mode in which all functions are shut down. After the battery 19 has been replaced or sufficiently recharged, a power-on reset is applied to restart operation.

Microcomputers 16 and 26 are equipped with respective volatile random-access memories (RAMs) 18 and 28, and non-volatile programmable read-only-memories (PROMs) 17 and 27, provided externally or on the same chip. Nowadays memories 17 and 27 are much more likely to be electrically-erasable PROMs (EEPROMs). The EEPROM in the remote unit 80 contains control information and at least the ID number assigned to that remote unit 80, while the EEPROM in the base unit 90 contains at least the ID number data of each of the multiple remote units that can be used with that base unit. PROM as used here and throughout refers to a non-volatile memory means, including when some or all such PROMs are EEPROMs.

In line with regulations governing the use of cordless telephone systems in Europe in particular, the radio link between base unit and remote unit, and the telephone line connection, has to be broken if the received field strength in the remote unit has fallen below a prescribed value and remains low for a prescribed time after the user has been alerted by a warning light or a warning tone from the telephone receiver. The remote unit 80 therefore includes an out-of-range detection circuit 14, a field strength detection circuit incorporated in accordance with the constitutional principles of known noise or carrier squelch circuits. If (via this out-of-range detection circuit 14) the microcomputer 16 detects that the received field strength falls below 30 dB$\mu$V/m, for example, after a prescribed period, for example one second, the microcomputer 16 alerts the user by emitting a signal that causes a warning means (not shown) to emit a warning lasting a prescribed period, for example 10 seconds (either continuously or in one-second pulses with a one-second separation). The microcomputer also causes an out-of-range signal 40 to be appropriately modulated in accordance with the format shown in FIG. 4 and transmitted from the antenna 11 to the base unit 90. Usually, if the received field strength does not recover within the prescribed signal transmission period (such as the above 10 seconds), the microcomputer 16 issues an end code via the transmit-receive circuit 12. If the received field strength does recover in time the microcomputer 16 stops the transmission of the out-of-range signal and resets the related signal duration timer.

The out-of-range signal 40 is handled in the same way as the other control signals described above, and uses the data format shown in FIG. 4, for example. This begins with communication data discrimination information 41 consisting of a 20-bit set of hexadecimal digital numerical values. This forms a code word indicating that communication information follows. This is followed by a 24-bit code word that forms that unit's ID number data 42, and an 8-bit set of connection channel data 43 indicating the designated radio channels currently established between base unit and remote unit (and not, therefore, needed if a fixed-channel system is being used rather than the MCA system). This is followed by an 8-bit set of out-of-range data 44 for indicating the transmitted communication data is the out-of-range signal 40. With the same data format applying in principle with respect to other control data, out-of-range data 44 is substituted for other control information. In other words, cordless telephone systems that use the out-of-range signal 40 have out-of-range data 44 in the form of a designated code word as one of the various types of communication information that conforms to the usual data format.

When the out-of-range signal 40 is received by the transmit-receive circuit 22 of the base unit 90 and decoded by the microcomputer 26, and as a result of no interruption occurring for the duration of the above prescribed time period an end code signal is received from the remote unit 80, the microcomputer 26 uses the line switching circuit 25 to open the line circuit.

The regulations relating to the out-of-range signal 40 thus apply only to the remote unit 80. However, the present inventor has already proposed a system in which the received field strength is also monitored at the base unit end. As in the arrangement at the remote unit end, if there is a drop in the received field strength at the base unit an out-of-range signal 40 is sent from the base unit to warn the user. After this warning has continued for a prescribed period of 10 seconds, for example, the telephone line circuit is opened by the line switching circuit 25. In a cordless telephone apparatus using a 900 MHz band, for example, in which the radio channel pair is formed by two waves separated by 45 MHz, even if the operating environment is such that an adequate received field strength can be ensured for the remote unit receiving channel, it is because the remote unit sending channel (base unit receiving channel) field strength remains quite low. With the idea that it was not enough to detect the field strength only with respect to the remote unit receiving channel, as shown in FIG. 5 the base unit 90 end was provided with the same type of out-of-range detection circuit 24 as the remote unit 80 to, therefore, form an arrangement whereby the same process is used to transmit an out-of-range signal 40 conforming to the data format of FIG. 4 from the base unit end when it is detected that the received field strength at the base unit 90 end has fallen below a prescribed value. The constitution of this out-of-range signal 40 from the base unit is advantageously applied in the preferred embodiment of the invention described below.

A representative arrangement of a conventional cordless telephone apparatus and a brief outline of the operation thereof have been described in above with reference to FIGS. 4 and 5. Changing a remote unit battery in most of the relatively early cordless telephone systems involved having to disconnect and connect special connector means, and the battery itself was usually a battery pack. This was to ensure a secure electrical connection between the battery 19 and the various circuits in the remote unit. In recent years, however, there has been growing demand for batteries that can be easily changed by anyone, and this has led to an increase in the use of battery holders with spring contacts, and no regard to whether batteries are primary or secondary.

Inasmuch as the ease of use of such battery holders has made them familiar to everyone, their use by a cordless telephone apparatus can be said to make it a better system. However, there is also a problem with battery holders, which is that if someone using a remote unit accidentally drops the unit on the floor or bangs it against a piece of furniture or the like, the impact can cause a spring contact to lose contact with a battery terminal, cutting off power to the circuits and halting all operations. Even if battery contact is restored almost immediately, it is too late to enable the call to be resumed. This is a frequent problem with systems which use a microcomputer as the control circuitry.

The problem is not limited to such accidents. When a user is making a call via a remote unit, and the voltage detection circuit 15 detecting a drop in the unit voltage activates a signal warning the user no matter how quickly the battery is replaced, it is too slow to prevent the power to the circuits being cut, breaking the call connection. JP-A Hei-2-177647 discloses a means designed to counter this problem. Specifically, in order to change the battery it is necessary to remove a battery holder cover. A means (substantially an electromechanical contact means) of detecting when this cover is removed is therefore incorporated, and when this means detects the removal of the cover, a changing-battery signal is from the remote unit to the base unit, which responds by putting the line connection on hold. When the replacement battery is then inserted, a signal signifying this is from the remote unit to the base unit, which then releases the line it has been holding. This means that detects the cover has been opened is described in the claim as a means that detects the battery has been removed. Substantially, however, it is interpreted as being limited to a cover open detection means, as described in the embodiments of the disclosure. However, as the supply of power to the circuits of the remote unit obviously stops the moment the voltage is removed, removing the battery prevents the operation of the very means that is supposed to detect the removal, and of the circuit that processes the detection signals.

OBJECT AND SUMMARY OF THE INVENTION

An object of the present invention is to provide a cordless telephone apparatus which, when the supply of power from an internal battery source of a remote unit that is in use is briefly interrupted, either by an accidental impact, or by an intentional action of the user, (such as to replace a battery, or other such cause), is capable of allowing the call to be resumed over the pair of radio channels that were being used for the two-way communication up until the interruption.

In accordance with the present invention, the above object is attained by a cordless telephone apparatus that detects the received field strength in the receiving channel, as viewed from the standpoint of the base unit. An out-of-range signal is out put from the transmit-receive circuit of the base unit if the field strength goes below a prescribed level, the remote unit being provided with an internal volatile memory area for memorizing a channel connection state that discriminates between whether or not two-way radio communication had been established between said remote unit and base unit. Also provided are a backup power source for maintaining the contents of the volatile memory area even if there is an interruption in the supply of power from the battery in the remote unit, and a call resumption control circuit. The call resumption control circuit is arranged so that the transmission of telephone call information from the remote unit is resumed when the channel connection state data stored in the volatile memory area when battery power is supplied to the remote unit is data indicating that two-way radio communication had been established and when the transmission of an out-of-range signal from the base unit side is detected via the transmit-receive circuit of the remote unit.

In principle the above basic configuration of the present invention can also be applied when there is only one remote unit. As mentioned, it can be applied to a cordless telephone apparatus able to use multiple remote units by assigning each remote unit its own individual ID number code. Thus, the system configuration also allows an arrangement in which the main control circuit of the base unit is utilized to cause the transmission of out-of-range signals to be accompanied by remote unit ID number codes recognized by the base unit, so that the call resumption control circuit in each of the remote units only resumes transmission of the call information when it receives the ID number code of its own remote unit and also detects an out-of-range signal.

A link permitting two-way communication between the base unit and each remote unit can be realized using an MCA system or a fixed-channel system. In an MCA-based embodiment of this invention, each remote unit is provided with a volatile memory area in which is stored connection channel data specifying the radio channels when two-way communication was established between the base unit and each remote unit. This volatile memory also has a backup power supply. When the transmission call information from a remote unit is resumed, under the control of the call resumption control circuit the radio channels used are those channels specified by the connection channel data (typically channel numbers) stored in the connection channel area of memory.

As mentioned, this type of cordless telephone apparatus usually uses a microcomputer as the main control circuitry incorporated in the base unit and remote units, and a microcomputer can also be applied to this invention. Such an arrangement would enable a software-based call resumption control circuit function to be devised within the microcomputer, and it would also enable the above-described channel connection state and connection channel memory areas to be provided within the microcomputer's own RAM rather than providing a memory device dedicated to that function.

In accordance with another preferred embodiment of the invention, prescribed memory check data is written into non-volatile memory provided in the remote unit, and a volatile memory area is also provided in RAM for transfer and storage of this memory check data. The backup power supply described above is also used to provide this volatile memory with backup power. When power is supplied from the battery source in the remote unit the memory check data in the volatile memory is compared with the memory check data in the non-volatile memory. Only when the sets of memory check data coincide does the call resumption control circuit allow transmission of the call information to resume. After a momentary break in the supply of battery power, this makes it possible to check the integrity of the volatile memory. If the comparison shows that the two sets of memory check data are not the same, the call resumption control circuit does not allow transmission of call information to resume but puts the remote unit into a wait state and the memory check data in the memory check data non-volatile memory is written into the memory check data volatile memory area.

Further features of the invention, its nature and various advantages will be more apparent from the accompanying drawings and following detailed description of the invention.

BRIEF DESCRIPTION OF THE DRAWINGS

FIG. 3 illustrates a volatile memory device provided of the same embodiment;

FIG. 4 shows the format of an out-of-range signal; and

DESCRIPTION OF THE PREFERRED EMBODIMENT

Figure 1:
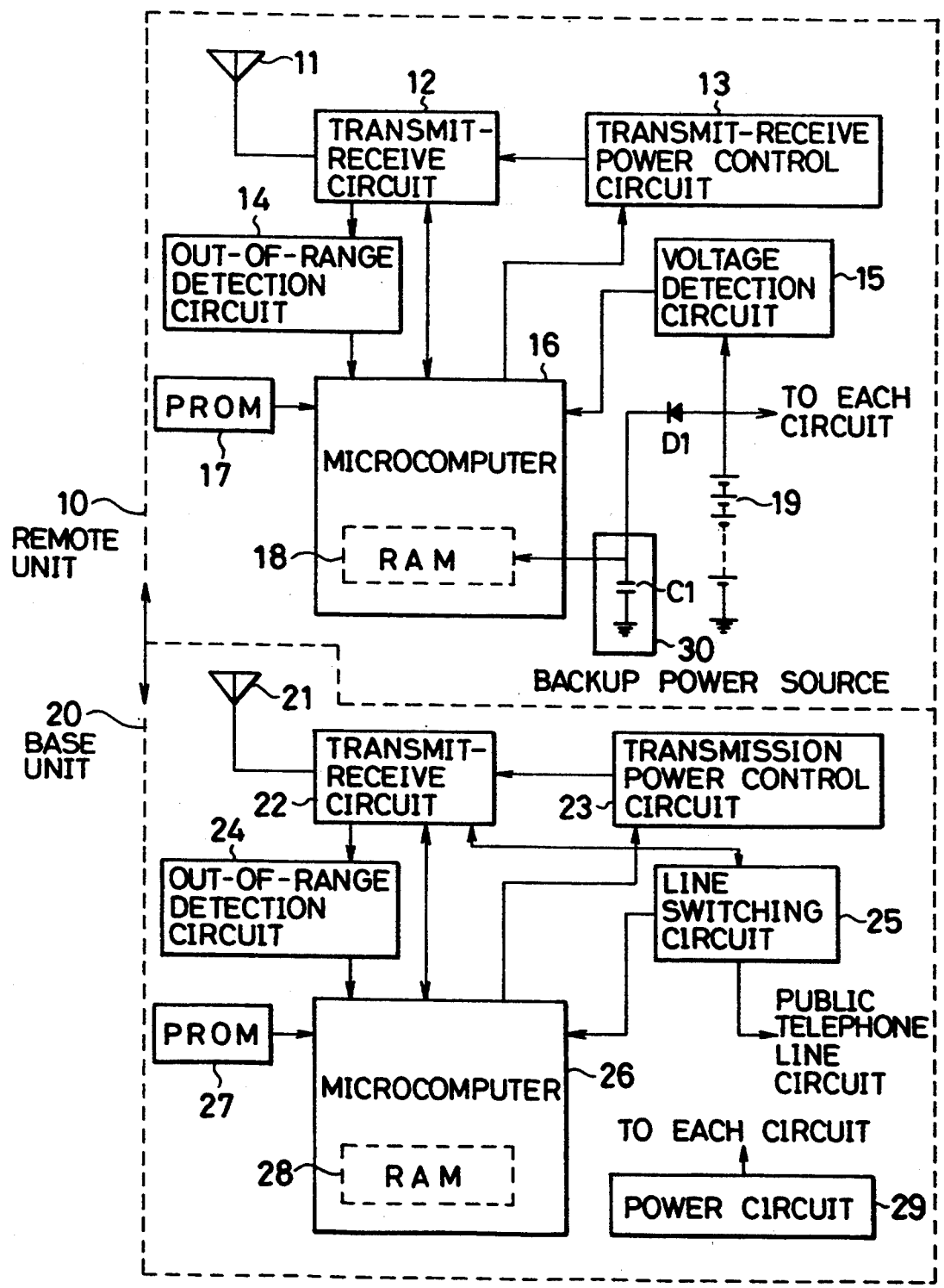
FIG. 1 shows the general circuit arrangement of an embodiment of the cordless telephone apparatus according to the invention.
Figure 5:
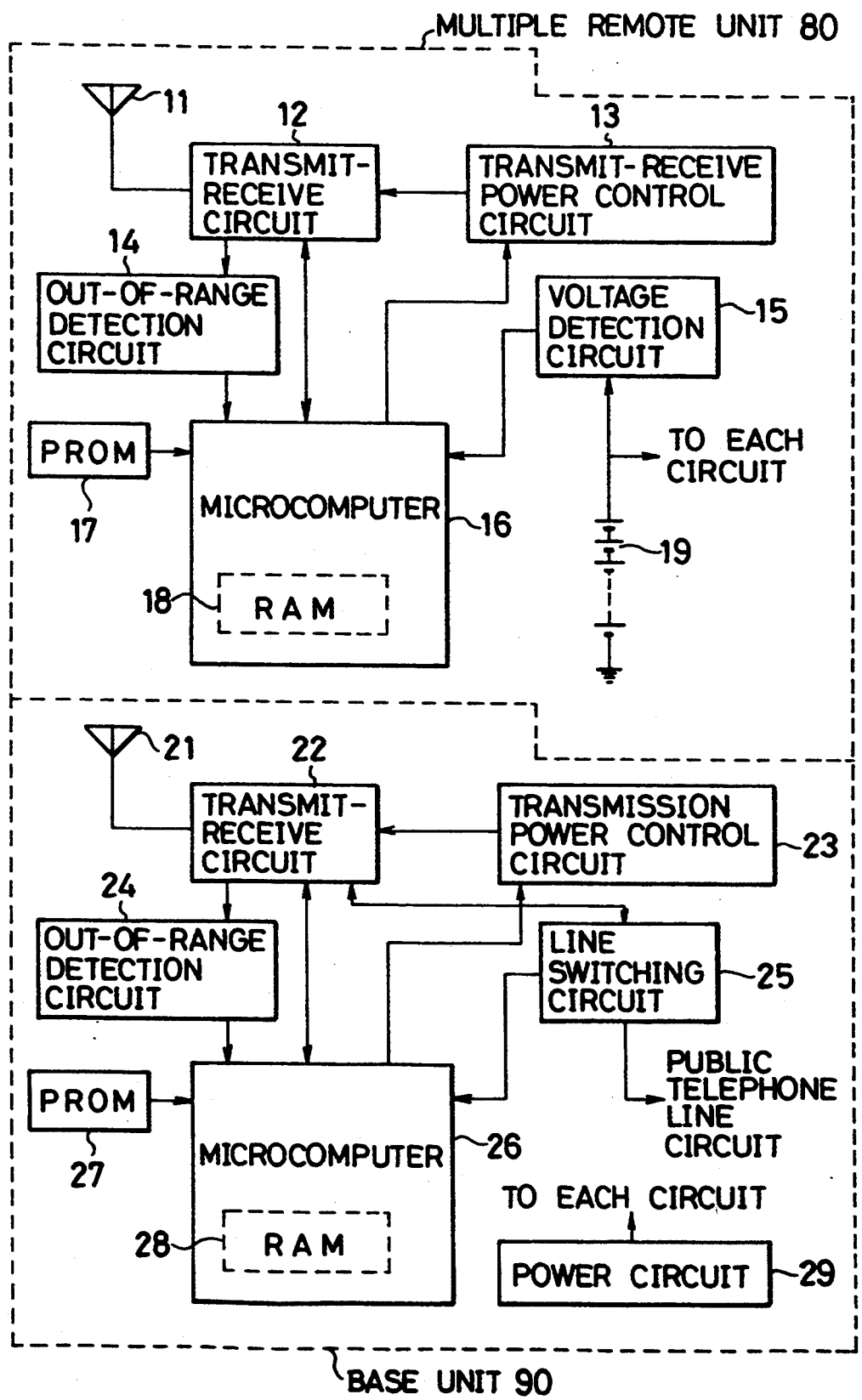
FIG. 5 shows the general circuit arrangement of a conventional cordless telephone apparatus.

FIG. 1 shows the circuit arrangement of an embodiment of the cordless telephone apparatus according to this invention. To clearly contrast parts to which the invention has been applied, the embodiment of FIG. 1 is shown as an improved version of the conventional apparatus of FIG. 5. Thus, parts of the remote unit 10 and base unit 20 of FIG. 1, having the same reference numeral as the corresponding parts in the remote unit 80 and base unit 90 of FIG. 5, signify that in the case of FIG. 1 the parts are the same as those of FIG. 5 or have not been changed to a significant degree. Also, therefore, unless otherwise stated, the descriptions already given relating to such circuit elements and/or the operation thereof basically also apply to the cordless telephone apparatus of this invention. This embodiment of the cordless telephone apparatus follows the MCA system, although the invention is not limited thereto.

Moreover, while FIG. 1 shows only one remote unit 10 and the invention can be applied to just one unit, in principle the invention relates to two or more remote units having the same internal structure as the remote unit 10 shown in FIG. 1.

In the embodiment of the cordless telephone apparatus according to the invention shown in FIG. 1, microcomputers 16 and 26 are used to control two-way radio communication between transmit-receive circuits 12 and 22 of the remote unit 10 and base unit 20, via antennas 11 and 21. An additional hardware element in the cordless telephone apparatus of this invention is a backup power source 30 in the remote unit 10. The backup power source 30 backs up the RAM 18 of the microcomputer 16 in the remote unit 10. The backup power source 30 may be a primary or secondary battery, as long as it is able to back up the RAM 18 for more than ten seconds. In the embodiment shown the backup power source 30 is a capacitor C1 that is charged from the internal replaceable (primary or secondary) battery 19 of the remote unit 10. Provided in the charging line is a diode D1 with a forward orientation with respect to the charging current. This prevents reverse charging of the capacitor C1 if the battery 19 is inserted with its terminals reversed, and it also prevents the capacitor discharging if there is an interruption of power to the remote unit circuits, caused for example by a knock that momentarily breaks the connection between the battery and the battery holder contacts. This, therefore, helps to optimize the RAM 18 backup power source function.

Existing RAM devices can be used, without any modification, as the RAM 18. However, it is necessary to reserve in the RAM 18 at least a memory area, or memory slot 54 as shown in FIG. 3, in which to store channel connection state data, described below. In this embodiment which assumes that MCA is being used, a memory slot 53 is also necessary for storing connection channel data. Also, while not required to meet the needs of the invention in its most basic configuration, a memory slot 52 is provided for storing ID number data, and a memory slot 51 for storing memory check data used to check the integrity of the contents of RAM 18.

In order to integrate into a main control circuit the various circuit control devices used in previous cordless telephone systems, (with this invention) it is necessary to add a call resumption control circuit. In this embodiment the microcomputer 16 constituting the main control circuit also handles this call resumption control circuit function.

Figure 2:
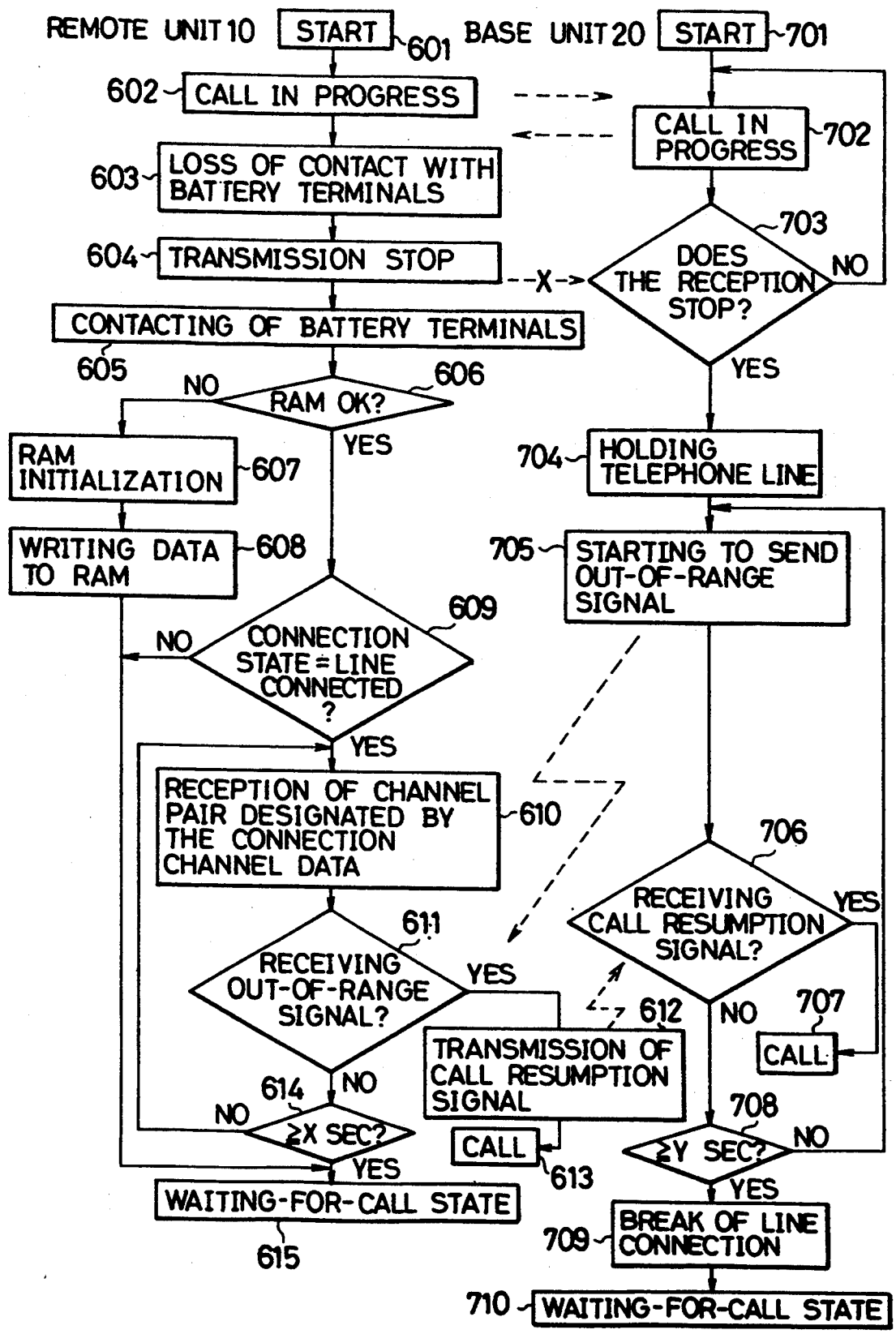
FIG. 2 shows the operational sequence of the same embodiment.

The structural features and operation of the cordless telephone apparatus of the invention will now be described with reference to the flow chart of FIG. 2. As shown, following the starting step 601 and 701, with respect to both remote unit 10 and base unit 20 step 602 and 702 are each marked "call in progress," indicating two-way radio communication over a pair of channels is enabled between the remote unit 10 and the base unit 20. Whether a call is originated from the remote unit 10 or a call comes in to the base unit 20 via a public telephone line, the cordless telephone apparatus of this invention may use the same conventional subsequent sequence of operations up to the point at which the two-way communication state is attained. In accordance with the MCA system channel pairs established between a specific remote unit and the base unit are selected from a group of channel pairs, for example 40.

These channels can normally be designated by a channel number.

In the remote unit 10 of this embodiment in which the microcomputer 16 forms the main control circuit and also functions as the call resumption control circuit, when two-way communication using a pair of radio channels is enabled between remote unit 10 and base unit 20, data indicating that a channel was established between the remote unit 10 and the base unit 20 is written by the microcomputer 16 into the volatile memory slot 54, located in the RAM 18 of microcomputer 16. In simple terms, when two-way communication is enabled, the microcomputer 16 writes channel connection state data in the form of a binary 1 into memory slot 54. If this flag is not set (meaning when a logical 0 is written to memory), there is no state of two-way radio channel communication between remote unit 10 and base unit 20. Thus, it can be determined in step 609 whether or not a channel pair had been established between the remote and base units prior to the interruption of power from the battery source.

In this embodiment the microcomputer 16 also writes connection channel data into memory slot 53. This data enables channel pairs actually being used between the remote unit 10 and base unit 20 to be specified (as a channel number, for example). As in existing cordless telephone systems that use MCA, the ID number data of each remote unit 10 is read out of PROM (which includes EEPROM) 17 and written into memory slot 52 when power is initially applied to the unit such as when a battery 19 is inserted, or in the case of remote units that have a power switch, when the power is switched on after a battery 19 has been inserted. Similarly, specific memory check data (which may be the same for all remote units) in the form of binary numerical values are read out of PROM 17 by microcomputer 16 and written into memory slot 51 at the initial power-up time. This write operation is also shown in the flow chart of FIG. 2 as steps 605 to 608.

If during two-way communication between the remote unit 10 and base unit 20 a terminal of the battery 19 momentarily loses contact with a battery holder terminal owing to the remote unit 10 being jarred or the like, creating the condition indicated in step 603 as "loss of contact with battery terminals," the supply of power to the remote unit 10 circuits is interrupted for the duration of the loss of contact. By the time the supply of power is reestablished, no matter how quickly, transmission from the remote unit 10 side has already stopped, as shown in step 604 (this also happens of course when battery 19 is removed for replacement purposes). This causes the out-of-range detection circuit 24 in the base unit 20 to detect that the field strength in the receiving channel (the sending channel, viewed from the remote unit side) has dropped below a prescribed value (step 703). Therefore with the telephone line on hold (step 704), after a set period has elapsed, (for example one second), the microcomputer 26 in base unit 20 responds to the detection signal and starts to send an out-of-range signal (step 705).

No call resumption is received in step 706, therefore after it has been determined in step 708 that a prescribed period of y seconds (for example 10 seconds) has passed since the base unit 20 started to transmit the out-of-range signal, (which has a format such as the one shown in Figure 4, for example), and under the control of the base unit microcomputer 26, in step 709 the line switching circuit 25 breaks the line connection and in step 710 the system assumes a normal waiting-for-call state. Although the telephone line connection may be maintained as it is until it is cut, a muting circuit may be included to attenuate the output volume from the base unit end to prevent the other party being subjected to unpleasant noise.

When it is determined in step 605 that the terminals of battery 19 have resumed contact with the battery holder contact points after the jarring, or because the user has inserted a fresh battery 19, in step 606 the microcomputer 16 checks the contents of RAM 18 to determine the integrity of the memory check data held in memory slot 51 and, by extension, the integrity of other data stored in the RAM 18. If the power interruption that shut down the transmission function is caused by the terminals of battery 19 being jarred out of contact, the resumption of contact will be almost instantaneous. If the interruption is caused by the user changing the battery and the battery change takes no more than a few seconds to complete, the backup power from the capacitor C1 (that forms the backup power source 30 in this invention) is probably enough to preserve the contents of the RAM 18. Thus, when power is resumed and the microcomputer 16 reads the memory check data out of PROM 17 and compares it with the memory check data in the RAM 18, the two sets of data will probably match.

However, when the system is powered-up after the supply of power has been interrupted for an extended period, or when a remote unit 10 is used for the first time or the like, the capacity of the backup power source 30 is likely to be insufficient to enable the RAM 18 to maintain its data. In this type of case, microcomputer 16 initializes RAM 18 in step 607, reads out memory check data and ID number data from PROM 17 and writes these to RAM 18 memory slot 51 and memory slot 52 in step 608, respectively, and in step 615 the system enters the waiting-for-call state. Thus, this operation is equivalent to the initialization of the RAM 18 when power is first switched on. Concerning this point, the flow chart process of FIG. 2 should not be regarded as being limited to a call-in-progress situation.

With the backup power source 30 operating effectively, when, with the resumption of power as contact with the battery is reestablished, microcomputer 16 reads out the memory check data stored in PROM 17 for comparison with the memory check data in RAM 18 and finds that the two sets of memory check data are the same, in step 606 a positive response is output, and in step 609 the microcomputer 16 reads the channel connection state data stored in the RAM 18 memory slot 54. If the data indicates that there was no channel connection, indicated by a "0" flag, for example, the microcomputer 16 remote unit circuits into a waiting-for-call state. If on the other hand there was a call in progress prior to the loss of contact with the battery power source and the channel connection state data therefore indicates that there was a channel connection, such as by means of a logical "1" flag, for example, as the microcomputer 16 also functions as the call resumption control circuit of the invention, in step 610 the microcomputer 16 controls the transmit-receive circuit 12 to enable reception of the channel pair designated by the connection channel data stored in the memory slot 53, that is, the channel pair in use by the remote unit 10 prior to the loss of battery contact.

In step 611, when the out-of-range signal 40 (which, as described with reference to FIG. 4, includes channel data 43 and own-unit ID number data 42 as well as out-of-range data 44) being transmitted from the base unit 20 is received, in step 612 the remote unit microcomputer 16 transmits a call resumption signal and permits transmission from the transmit-receive circuit 12. As a result, in step 613 there is a return to normal call status and, in addition, the microcomputer 26 of the base unit that receives the call resumption signal also reverts to the original, preferably muted, circuit status, whereby the unit assumes normal call status (step 707). On the other hand, if in step 611 the remote unit does not receive an out-of-range signal within a period of x seconds (from several seconds up to ten-odd seconds) prescribed in step 614, the microcomputer 16 puts the remote unit into a waiting-for-call state.

While using a common type of battery 19 holder makes it easy for anyone to use, such holders have been prone to momentary loss of contact with the battery when jarred or the like. However, unlike in the prior art arrangement in which such a loss of contact would terminate a call, with the above-described arrangement the call line is reestablished with the reestablishment of battery contact. It is also possible to change batteries during a call and be able to resume the call, providing the changeover is performed within the 10 seconds or so that the out-of-range signal is output by the base unit.

The above embodiment can be modified in various ways as long as any such modifications do not depart from the essential scope of the invention. If, for example, a fixed-channel system is applied with respect to a cordless telephone apparatus able to communicate with a multiplicity of remote units by means of ID numbers, there would be no need for the connection channel data that is stored in memory slot 53. To put it another way, if channel data is required, a feasibility check on this data can be performed at the same time as the memory check step 606. Data that is "feasible" would mean, for example, a channel number that is one of the channel numbers that can actually be used.

In the above embodiment, also, it is stated that it is preferable to mute the telephone line when the out-of-range signal is being sent from the base unit. If this is not done, the transmission of the call resumption signal from the remote unit end, step 612, can be omitted. Reversion to the call state may be effected as soon as it has been determined in step 611 that an out-of-range signal has been received, and if as a result of the resumption of signal transmission the base unit out-of-range detection circuit 24 detects that the received field strength exceeds the prescribed field strength value, the microcomputer 26 can stop the transmission of the out-of-range signal.

The supplementary volatile memory applied in the above embodiment may be added as a separate memory device independent of the existing microcomputer RAM 18, or as another non-volatile memory device for storing memory check data. This memory check data is not an essential part of the basic arrangement of the invention. If the backup power source 30 has a high degree of reliability, the RAM check step 606 may be omitted, in which case an arrangement can be used whereby ID number data is transferred from PROM 17 to RAM 18 when the power-on reset is done. The backup power source 30 should be able to backup the RAM 18 for about the length of time the out-of-range signal is transmitted by the base unit (around 10 seconds). Using a capacitor of around 100 $\mu$F. for the purpose is simple, cheap and compact, but a primary or secondary battery may be used instead.

What is claimed is:

1. A cordless telephone apparatus comprising:
   a base unit connected by wire to a public telephone line circuit;
   a remote unit driven by an internal replaceable battery power source;
   a radio transmit-receive circuit, provided in the remote unit, and controlled by a main control circuit, that can transmit modulated call information from the remote unit via one of a pair of radio channels with mutually different frequencies for two-way radio communication, and can demodulate call information received from the base unit via the other channel;
   a radio transmit-receive circuit, provided in the base unit, and controlled by a main control circuit, that can demodulate call information received from the remote unit via said one of a pair of radio channels, and can transmit from the base unit modulated call information carried by said other channel;
   control circuit, provided in the base unit, that detects received field strength on said one of a pair of radio channels, output an out-of-range signal on said other channel via the transmit-receive circuit provided on the base unit if the detected field strength is below a prescribed field strength, and breaks the connection with the public telephone line circuit if the received field strength remains below the prescribed field strength for a prescribed time period;
   a channel connection state volatile memory area, provided in the remote unit, in which channel establishment data is stored when two-way radio communication was established via the pair of radio channels between the base unit and the remote unit, and in which channel non-establishment data is stored when said communication was not established;
   a backup power source, provided in the remote unit, that maintains the channel establishment data or channel non-establishment data selectively stored in the volatile memory area even if the supply of power from the battery source is interrupted; and
   a call resumption control circuit, provided in the remote unit, that resumes transmission of call information from the remote unit, when it determines that the result of a check of the volatile memory area when power was supplied from the battery source in the remote unit is that channel establishment data is stored in said volatile memory area and when an out-of-range signal is detected via the transmit-receive circuit in the remote unit.

2. A cordless telephone apparatus according to claim 1, wherein:
   said apparatus is provided with a plurality of remote units and individual ID number data is assigned to each remote unit;
   the main control circuit of the base unit can recognize the ID number data of the remote unit with which two-way communication is taking place;
   an out-of-range signal transmitted by the base unit main control circuit via the transmit-receive circuit of the base unit is accompanied by the recognized ID number data of the remote unit; and
   the call resumption control circuit in each remote unit only resumes transmission of the call information when said circuit receives the ID number data associated with its own remote unit and detects the out-of-range signal.

3. A cordless telephone apparatus according to claim 2, wherein:
the two-way communication link between the base unit and each remote unit is effected in accordance with a multi-channel access system;
each remote unit is provided with a volatile memory area for storing connection channel data specifying the channel pair at the time two-way communication was established, and this volatile memory area is also backed up by said backup power source; and
when transmission of call information from said remote unit is resumed by the call resumption control circuit, the channel pair used for the transmission is the channel pair specified by the connection channel data stored in the connection channel memory area.

4. A cordless telephone apparatus according to claim 1, wherein:
the main control circuit in the remote unit is a microcomputer; and
the channel connection data volatile memory area is provided within a random-access memory associated with said microcomputer.

5. A cordless telephone apparatus according to claim 3, wherein:
the main control circuit in the remote unit is a microcomputer;
the channel connection data volatile memory area is provided within a random-access memory associated with said microcomputer; and
the connection channel memory area also is provided within said random-access memory associated with said microcomputer.

6. A cordless telephone apparatus according to any one of claims 4 or 5, wherein:
a non-volatile memory containing memory check data is provided in the remote unit;
also provided, within the random-access memory, is a volatile memory area in which to store said memory check data from the non-volatile memory area; this memory check data volatile memory area is also backed up by said backup power source; and
the call resumption control circuit only allows a resumption of the transmission of call information when a comparison of memory check data in the memory check data volatile memory area with memory check data in the non-volatile memory when power is supplied from the battery source in the remote unit shows that the two sets of memory check data match.

7. A cordless telephone apparatus according to claim 6, wherein:
when as a result of the comparison of memory check data in the non-volatile memory with memory check data in the volatile memory area it is found that the two sets of memory check data do not match the call resumption control circuit puts the remote unit into a waiting-for-call state without allowing the resumption of the transmission of call information, and memory check data in said non-volatile memory is written to said memory check data volatile memory area.

8. A cordless telephone apparatus according to any one of claims 1 to 5, wherein:
the call resumption control circuit transmits a call resumption signal prior to allowing a resumption of the transmission of call information; and
the main control circuit in the base unit breaks the connection with the public telephone line circuit if said call resumption signal is not received within a prescribed period of time from the emission of the out-of-range signal.

9. A cordless telephone apparatus according to any one of claims 4 or 5, wherein:
the microcomputer forming the main control circuit is used to also constitute the call resumption control circuit.

10. A cordless telephone apparatus according to any one of claims 1 to 5, wherein:
the backup power source is a capacitor charged by the battery.

* * * * *